(12) United States Patent
Mikashima

(10) Patent No.: US 8,941,858 B2
(45) Date of Patent: Jan. 27, 2015

(54) IMAGE FORMING APPARATUS AND CONTROL METHOD OF IMAGE FORMING APPARATUS HAVING A NORMAL MODE AND A POWER SAVING MODE

(71) Applicant: KYOCERA Document Solutions Inc., Osaka (JP)

(72) Inventor: Katsuo Mikashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/279,124

(22) Filed: May 15, 2014

(65) Prior Publication Data

US 2014/0355052 A1 Dec. 4, 2014

(30) Foreign Application Priority Data

May 29, 2013 (JP) ................................ 2013-112896

(51) Int. Cl.
*G06K 15/00* (2006.01)
*H04N 1/00* (2006.01)
(52) U.S. Cl.
CPC ................................ *H04N 1/00896* (2013.01)
USPC ........................ 358/1.14; 358/1.15; 358/1.16
(58) Field of Classification Search
CPC .................................................. H04N 1/00896
USPC .............................................. 358/1.14–1.16
See application file for complete search history.

(56) References Cited

U.S. PATENT DOCUMENTS

| 2006/0193013 | A1* | 8/2006 | Hoshi | 358/474 |
| 2008/0133953 | A1* | 6/2008 | Kawaji | 713/322 |
| 2011/0231026 | A1* | 9/2011 | Yaoyama | 700/291 |
| 2011/0286027 | A1* | 11/2011 | Nozawa | 358/1.14 |
| 2011/0320842 | A1* | 12/2011 | Narushima et al. | 713/323 |
| 2013/0010335 | A1* | 1/2013 | Baba et al. | 358/3.01 |
| 2014/0002844 | A1* | 1/2014 | Miyamoto et al. | 358/1.13 |

FOREIGN PATENT DOCUMENTS

JP 2007-86983 A 4/2007

* cited by examiner

*Primary Examiner* — Benny Q Tieu
*Assistant Examiner* — Quyen V Ngo
(74) *Attorney, Agent, or Firm* — Stein IP, LLC

(57) ABSTRACT

An image forming apparatus has a normal mode and a power saving mode. The image forming apparatus includes a printing portion for performing printing, a communication portion for performing a communication process, a system controller for performing operation control of the apparatus and a process concerning communication, and a power supply controller configured to supply power to the printing portion, the system controller, and the communication portion in the normal mode while in the power saving mode, to supply power to the communication portion but to stop power supply to the printing portion. The system controller performs the process concerning communication during the power saving mode, and the power supply controller adjusts a length of a stop time so that average power consumption of the image forming apparatus does not exceed a permissible maximum power, so as to temporarily restore the system controller during the power saving mode.

14 Claims, 7 Drawing Sheets

IMAGE FORMING APPARATUS AND CONTROL METHOD OF IMAGE FORMING APPARATUS HAVING A NORMAL MODE AND A POWER SAVING MODE

CROSS-REFERENCE TO RELATED APPLICATIONS

This application is based upon and claims the benefit of priority from the corresponding Japanese Patent Application No. 2013-112896, filed May 29, 2013, the entire contents of which are hereby incorporated by reference.

BACKGROUND OF THE INVENTION

The present disclosure relates to a power saving technique for an image forming apparatus.

Equipment (image forming apparatus) such as a multifunction peripheral or a printer may have a normal mode and a power saving mode. The power saving mode is a mode for saving power in a non-use state (standby state). In the power saving mode, the number of portions supplied with power in the system is reduced to be smaller than that in the normal mode in order to reduce power consumption. Therefore, functions of the equipment cannot be used in the power saving mode. In order to use the equipment, it is necessary to restore the equipment to the normal mode so as to restart power supply to the individual portions. Further, as to equipment connected to a network, the equipment may be maintained in a communicable state also in the power saving mode, and a specific bit pattern (wakeup packet) may be sent to the equipment in the power saving mode so as to restore the equipment from the power saving mode to the normal mode by network communication.

For instance, there is known equipment having a power saving state, a normal state, and a power saving function, in which restoration from the power saving state to the normal state is performed based on an input frequency of a signal including a specific bit pattern. In this structure, not only a condition that a wakeup pattern has been received but also a condition that the number of wakeup patterns received per unit time is a predetermined threshold value or larger is used as the condition for restoring from the power saving state to the normal state. In this way, the requirement to maintain the power saving state of the equipment is prioritized to the requirement to use the equipment.

As described above, the image forming apparatus has the normal mode and the power saving mode. In the power saving mode, power supply to a part of the system such as a printing portion for executing a job may be stopped. On the other hand, even in the power saving mode, in order to maintain a minimum function, power may be supplied to a circuit or a substrate such as a communication portion for receiving a request or information from the network and a controller for performing a process to be performed even in the power saving mode (for example, a process concerning communication).

Specifically, as for the controller, it is necessary to regularly perform a process to be performed every constant period by control software such as an OS of the image forming apparatus or a process concerning a network communication response even in the power saving mode. Therefore, power may be temporarily supplied to the controller for performing a necessary process even in the power saving mode, and afterward the power supply to the controller is stopped. In other words, even in the power saving mode, the controller may be started to be temporarily restored.

Here, there are standards concerning power consumption (power saving) of the image forming apparatus in USA, Japan, Europe, and the like. For instance, there are standards such as Energy Star. In these standards, it is necessary to suppress power consumption of the image forming apparatus even in the power saving mode. Therefore, in designing the image forming apparatus, a target or a specification concerning power consumption of the controller during the power saving mode is set considering the standards. In order to achieve the target and the specification, an operation and power consumption of the controller in the power saving mode are designed in view of a hardware aspect and a software aspect.

However, when controller is temporarily restored every time when a request to communicate is received from the network, a frequency of the temporary restoration of the controller is increased. When start and temporary restoration of the controller are performed frequently during the power saving mode, average power consumption of the image forming apparatus during the power saving mode is increased. Therefore, when the controller is frequently restored during the power saving mode, a target, a specification or a public standard concerning power consumption of the controller during the power saving mode may not be satisfied with high possibility.

Here, the above-mentioned technique for restoring to the normal mode by the wakeup pattern is not a technique concerning start and restoration of a circuit or a substrate such as a controller in the power saving mode. Further, it is necessary to perform the process including determination process of the wakeup pattern by a communication substrate for performing a process concerning network communication during the power saving mode. Therefore, the structure is apt to have a relatively large scale so that the power consumption is increased. Then, there may be a case where power consumption of the image forming apparatus in the power saving mode cannot be reduced.

SUMMARY OF THE INVENTION

In order to solve the above-mentioned problem, an image forming apparatus according to a first aspect of the present disclosure has a normal mode and a power saving mode for reducing power consumption to be smaller than that in the normal mode, in which the normal mode is changed to the power saving mode when a predetermined condition for proceeding to the power saving mode is satisfied in the normal mode, and the normal mode is restored when a predetermined restoration condition is satisfied. The image forming apparatus includes a printing portion constituting a system so as to perform printing, a communication portion connected to a network so as to perform a communication process, a system controller configured to perform control concerning operation of the image forming apparatus, and a process concerning communication for performing network communication by the communication portion, and a power supply controller configured to supply power to the printing portion, the system controller, and the communication portion in the normal mode, while in the power saving mode, to supply power to the communication portion but to stop power supply to the printing portion, and to alternately repeat a supply time during which power is supplied to the system controller and a stop time during which power supply to the system controller is stopped. The system controller performs the process concerning communication during the power saving mode. The power supply controller adjusts a length of the stop time during the power saving mode so that average power consumption of the image forming apparatus in the power saving mode does not exceed a predetermined permissible maximum power, so as to temporarily restore the system controller during the power saving mode.

Further features and advantages of the present disclosure will become more apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Now, an embodiment of the present disclosure is described with reference to FIGS. 1 to 7. In the following description, a multifunction peripheral 100 is exemplified and described as an image forming apparatus including a communication portion 1. However, elements of structure and layout described in the embodiment are merely examples for description and should not be interpreted to limit the scope of the disclosure.

(Outline of Image Forming Apparatus)

Figure 1:
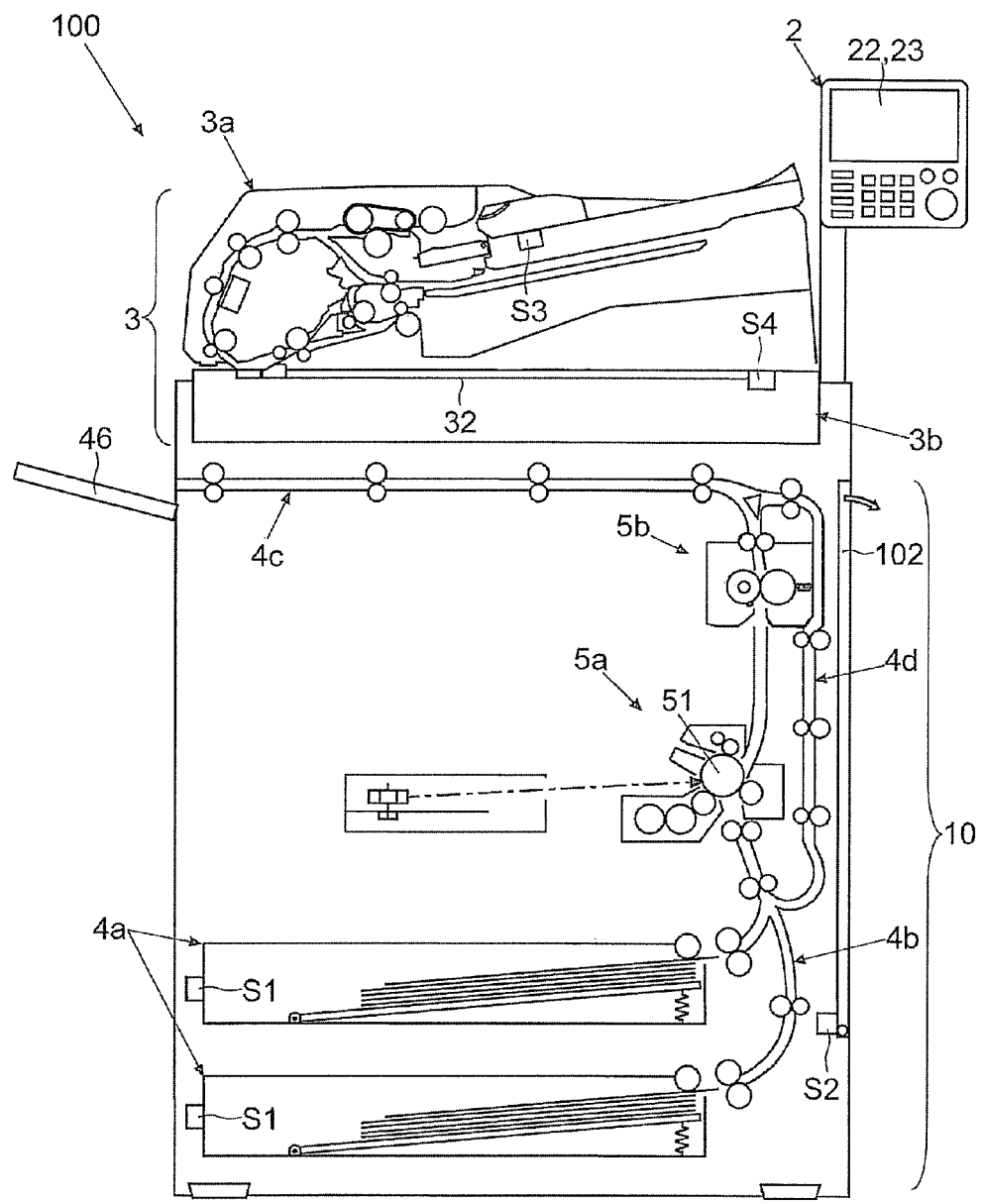
FIG. 1 is a diagram illustrating an example of a multifunction peripheral according to an embodiment.

First, with respect to FIG. 1, the multifunction peripheral 100 according to the embodiment is described. FIG. 1 is a diagram illustrating an example of a structure of the multifunction peripheral 100.

As illustrated in FIG. 1, the multifunction peripheral 100 of this embodiment includes an operation panel 2 mounted on the side. Further, the multifunction peripheral 100 includes a document reader 3 constituted of a document feeder 3a and an image reader 3b disposed on the upper part. Further, the multifunction peripheral 100 includes, as a printing portion 10 constituting a part of a system disposed inside, a paper sheet feeder 4a, a first transport portion 4b, an image forming portion 5a, a fixing portion 5b, and a second transport portion 4c.

First, as illustrated in FIG. 1, the operation panel 2 includes a display portion 22 for displaying various messages and setting screens, and a touch panel portion 23 for detecting user's operation on the display portion 22. In order to feed and read document sheets, the document feeder 3a feeds the document sheets one by one to a reading position. The image reader 3b reads the document sheet fed by the document feeder 3a or a document placed on a place reading contact glass 32 so as to generate image data of the document.

The paper sheet feeder 4a stores a plurality of paper sheets and sends out the paper sheets in printing. The first transport portion 4b transports the paper sheet fed by the paper sheet feeder 4a to the image forming portion 5a. The image forming portion 5a forms an electrostatic latent image on an outer circumference surface of a photoreceptor drum 51, develops the electrostatic latent image with toner, and transfers the toner image onto the paper sheet. The fixing portion 5b fixes the toner image onto the paper sheet. The second transport portion 4c transports the paper sheet after passing through the fixing portion 5b to a discharge tray 46. Further, in double-sided printing, the paper sheet after one side is printed is transported again to an upstream of the image forming portion 5a by a transport portion 4d for double-sided printing.

(Hardware Structure of Multifunction Peripheral 100)

Figure 2:
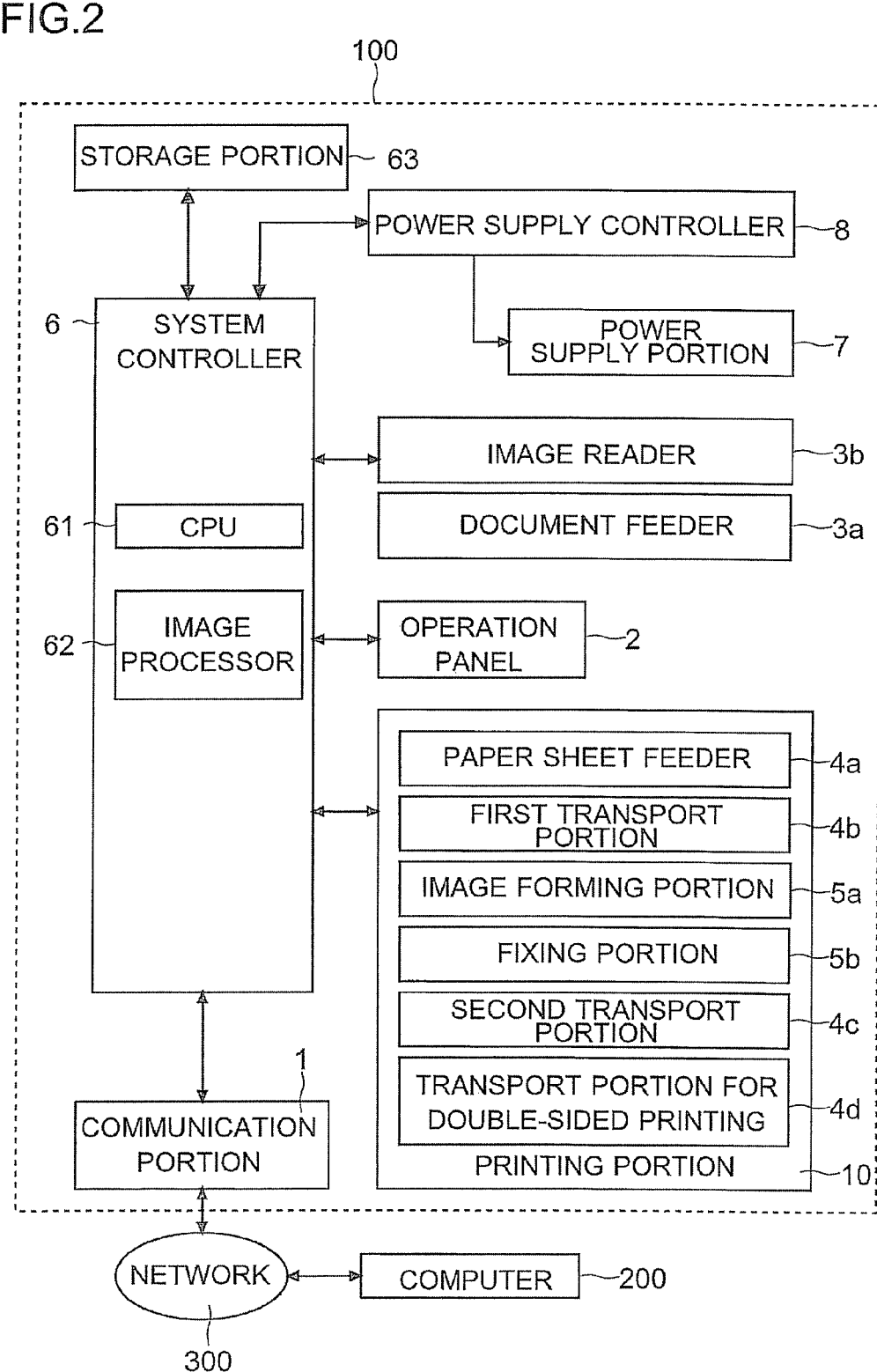
FIG. 2 is a diagram illustrating an example of a hardware structure of the multifunction peripheral according to the embodiment.

Next, with reference to FIG. 2, a hardware structure of the multifunction peripheral 100 according to the embodiment is described. FIG. 2 is a diagram illustrating an example of a hardware structure of the multifunction peripheral 100.

As illustrated in FIG. 2, the multifunction peripheral 100 according to this embodiment includes a system controller 6. The system controller 6 controls individual portions for controlling operation of the image forming apparatus (multifunction peripheral 100). In addition, the system controller 6 performs a process concerning communication for performing communication by the communication portion 1 via a network 300. The system controller 6 includes a CPU 61, an image processor 62 for generating image data to be used for printing and transmission, and other electronic circuits and elements.

The CPU 61 is a central processing unit and performs control of individual portions of the multifunction peripheral 100 and calculation based on control programs and control data stored in a storage portion 63. The storage portion 63 is constituted as a combination of nonvolatile and volatile storage devices such as a ROM, a RAM, a flash ROM, and an HDD.

Further, the system controller 6 controls the printing portion 10 for performing printing by paper sheet transportation, toner image formation, transferring, and fixing (the paper sheet feeder 4a, the first transport portion 4b, the image forming portion 5a, the fixing portion 5b, the second transport portion 4c, and the transport portion 4d for double-sided printing). It is possible to dispose an engine controller separately, and to configure that the system controller 6 issues an instruction to the engine controller so that the engine controller controls printing operation of the printing portion 10.

In addition, the system controller 6 is connected to the communication portion 1. The communication portion 1 is an interface for performing communication with a computer 200 such as a personal computer via the network 300. The communication portion 1 receives print data containing image data and print setting from the computer 200. Then, the system controller 6 controls the printing portion 10 to perform printing based on print data (printer function). In addition, the communication portion 1 can transmit the image data obtained by reading the document to the computer 200 (transmission function). In addition, the communication portion 1 receives a request from the network 300 based on a protocol adopted in the network 300 and sends response to the network 300.

The communication portion 1 includes a proxy response portion 11, a communication memory 12, a communication controller 13 as a controller for controlling transmission and reception (details will be described later, see FIG. 5). The communication controller 13 includes a circuit for controlling communication and a circuit for measuring time, so as to measure time concerning supply and stop of power to the system controller 6.

In addition, the system controller 6 controls operations of the image reader 3b and the document feeder 3a. In addition, the system controller 6 controls display operation of the operation panel 2. In addition, the system controller 6 recognizes content of setting performed on the operation panel 2 and recognizes content and setting of a job and an execution instruction.

(Power Supply System)

Figure 3:
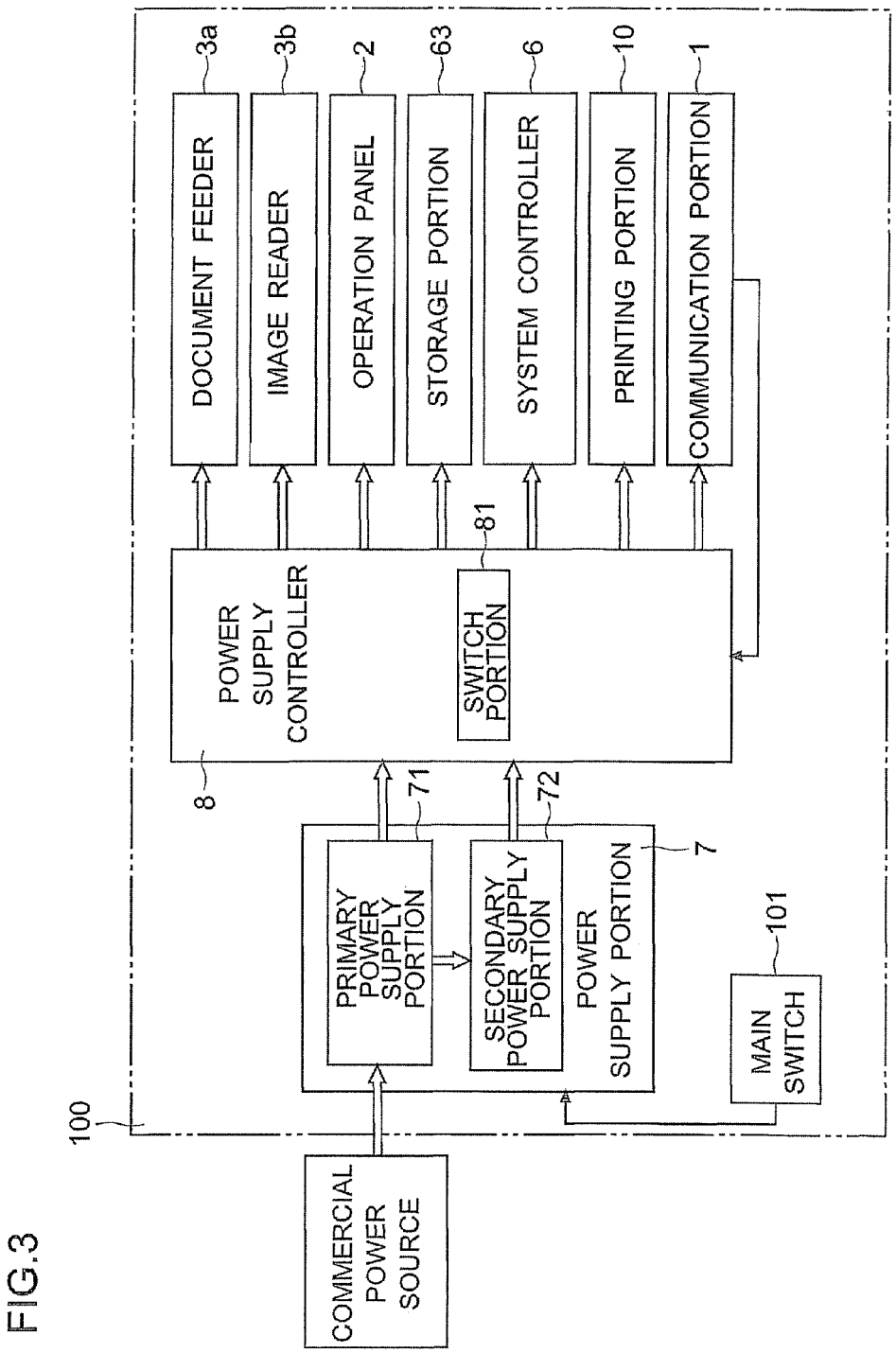
FIG. 3 is a diagram illustrating an example of a power supply system of the multifunction peripheral according to the embodiment.

Next, with reference to FIG. 3, a power supply system of the multifunction peripheral 100 according to the embodiment is described. FIG. 3 is a diagram illustrating an example of the power supply system of the multifunction peripheral 100.

First, the multifunction peripheral 100 includes a power supply portion 7 as a portion for generating various voltages so as to supply power to individual portions of the multifunction peripheral 100. The power supply portion 7 is connected to a commercial power source via an outlet and a power cord. Further, a main switch 101 for turning on and off a main power is disposed on the side face or the like of the multifunction peripheral 100. When the main power is turned on by the main switch 101, the power supply portion 7 operates. When the main power is turned off, a whole or a part of the power supply portion 7 stops operation so that the main power of the multifunction peripheral 100 is turned off.

The power supply portion 7 includes a primary power supply portion 71. The primary power supply portion 71 is a switching power supply circuit for generating a DC voltage from the commercial power source. The primary power supply portion 71 includes a coil, a capacitor, a semiconductor switch, and a backflow prevention diode. The primary power supply portion 71 is supplied with power from the commercial power source and generates a constant DC voltage (for example, DC 24 V for driving a motor).

In addition, the power supply portion 7 includes a secondary power supply portion 72 for stepping down the voltage generated by the primary power supply portion 71. The secondary power supply portion 72 generates various DC voltages for operating electronic circuits such as a CPU, a microcomputer, and a memory disposed in the system controller 6, the storage portion 63, the substrate included in the printing portion 10, the communication portion 1, the document feeder 3a, the image reader 3b, the operation panel 2, and the like. For instance, the secondary power supply portion 72 generates voltages of DC 5 V, 3.3 V, 2.5 V, 1.8 V, 1.2 V, and the like for driving circuits and elements.

Further, the multifunction peripheral 100 includes a power supply controller 8. The power supply controller 8 controls power supply of the voltages for the circuits of the document feeder 3a, the image reader 3b, the operation panel 2, the storage portion 63, the system controller 6, the printing portion 10, and the communication portion 1, and power supply for driving the motors disposed in the multifunction peripheral 100. In this way, the power supply controller 8 controls power supply from the power supply portion 7 to the portions constituting the multifunction peripheral 100.

Here, the power supply controller 8 can supply and stop power separately to each of the portions constituting the system as the multifunction peripheral 100, including the document feeder 3a, the image reader 3b, the operation panel 2, the storage portion 63, the system controller 6, the printing portion 10, and the communication portion 1. In order to switch between supply and stop of power separately to each of the portions constituting the system, the power supply controller 8 includes a switch portion 81. The switch portion 81 includes a plurality of semiconductor switches so as to switch destinations (power supply destinations) of the voltages generated by the primary power supply portion 71 and the voltages generated by the secondary power supply portion 72 in accordance with a mode of the multifunction peripheral 100 (details will be described later).

(Normal Mode and Power Saving Mode)

Next, with reference to FIG. 3, a normal mode and a power saving mode of the multifunction peripheral 100 according to the embodiment are described.

First, when the main power is turned on by the main switch 101, the power supply controller 8 of the power supply portion 7 controls the primary power supply portion 71 and the secondary power supply portion 72 to operate. The primary power supply portion 71 and the secondary power supply portion 72 generate the voltages for operating the multifunction peripheral 100. Further, the power supply controller 8 controls the switch portion 81 to start to supply the generated voltages (powers) to the individual portions of the multifunction peripheral 100 (the document feeder 3a, the image reader 3b, the operation panel 2, the storage portion 63, the system controller 6, the printing portion 10, the communication portion 1, and the like).

In this way, the individual portions of the multifunction peripheral 100 perform initial processes (warm up processes). After the main power is turned on, a main program is read out from the storage portion 63, the system controller 6 is started, and the fixing portion 5b is warmed up. Then, the multifunction peripheral 100 starts operation in the normal mode.

The normal mode is a mode in which power is supplied to portions that are not supplied with power in the power saving mode (supply stop portions) so that all functions of the multifunction peripheral 100 can be used. In other words, the normal mode corresponds to the state where a job is being executed in the multifunction peripheral 100 or the state where the multifunction peripheral 100 is maintained to be ready for promptly performing a job. Therefore, in the normal mode, the power supply controller 8 supplies power to all portions constituting the multifunction peripheral 100 including the document feeder 3a, the image reader 3b, the operation panel 2, the storage portion 63, the system controller 6, the printing portion 10, and the communication portion 1.

For instance, in the normal mode, the power supply controller 8 supplies power to the system controller 6 and the storage portion 63 to operate, and in the printing portion 10, intermittent current is supplied to a heater so that the fixing portion 5b can maintain a constant temperature. Therefore, a relatively large power is consumed in the multifunction peripheral 100 even in the state where no job is being executed.

Therefore, in order to reduce power consumption in a standby state in which the multifunction peripheral 100 is not used, the multifunction peripheral 100 has the power saving mode. The power saving mode is a mode for reducing power consumption to be smaller than in the normal mode by stopping power supply to the supply stop portions.

In the power saving mode, the power supply controller 8 controls the switch portion 81 to stop power supply to the document feeder 3a, the image reader 3b, the operation panel 2, the storage portion 63, and the printing portion 10. On the other hand, in order that print data from the computer 200 and request from the network 300 to the multifunction peripheral 100 can always be received in real time, the power supply controller 8 continues to supply power to the communication portion 1 even in the power saving mode.

In addition, the multifunction peripheral 100 of this embodiment has a process to be performed by the system controller 6 even in the power saving mode. Specifically, when the system controller 6 starts, an OS 64 starts based on data stored in the storage portion 63 (see FIG. 5). The OS 64 has a real-time property. Therefore, it is necessary that the system controller 6 (CPU 61 thereof) performs a process every defined time period for a process in one or more functional modules of the OS 64.

Similarly, the communication portion 1 is connected to the network 300, and it is necessary that the multifunction peripheral 100 continues to function on the network 300 (so that the computer connected to the network can recognize). Therefore, before a time-out time defined in the communication protocol elapses, the system controller 6 (CPU 61 thereof) must perform the process concerning communication so as to send a result of the process to the network 300 (to respond to the request) via the communication portion 1. For instance, when an IP address is dynamically assigned, an address with no response cannot be recognized as being used or not. Therefore, the communication portion 1 is required to send a response to the network 300 at a certain time interval.

In this way, the multifunction peripheral 100 of this embodiment temporarily operates the system controller 6 in the power saving mode so as to perform the necessary process. Further, in the power saving mode, the power supply controller 8 controls the switch portion 81 so as to repeat supply and stop of power to the system controller 6. In other words, in the power saving mode, power is temporarily supplied to the system controller 6 so that the system controller 6 starts to perform the necessary process, and then power supply to the system controller 6 is stopped for power saving. At the next time point to perform the necessary process, power is supplied again to the system controller 6.

As described later in detail, in the multifunction peripheral 100 of this embodiment, the communication portion 1 gives the power supply controller 8 the request to start power supply to the system controller 6 in the power saving mode and the request to stop power supply to the system controller 6. When receiving the request, the power supply controller 8 starts power supply to the system controller 6 and stops power supply in the power saving mode. Note that the request to stop power supply may be issued to the power supply controller 8 from the system controller 6 that is temporarily restored to operate.

(Transition Between Normal Mode and Power Saving Mode)

Figure 4:
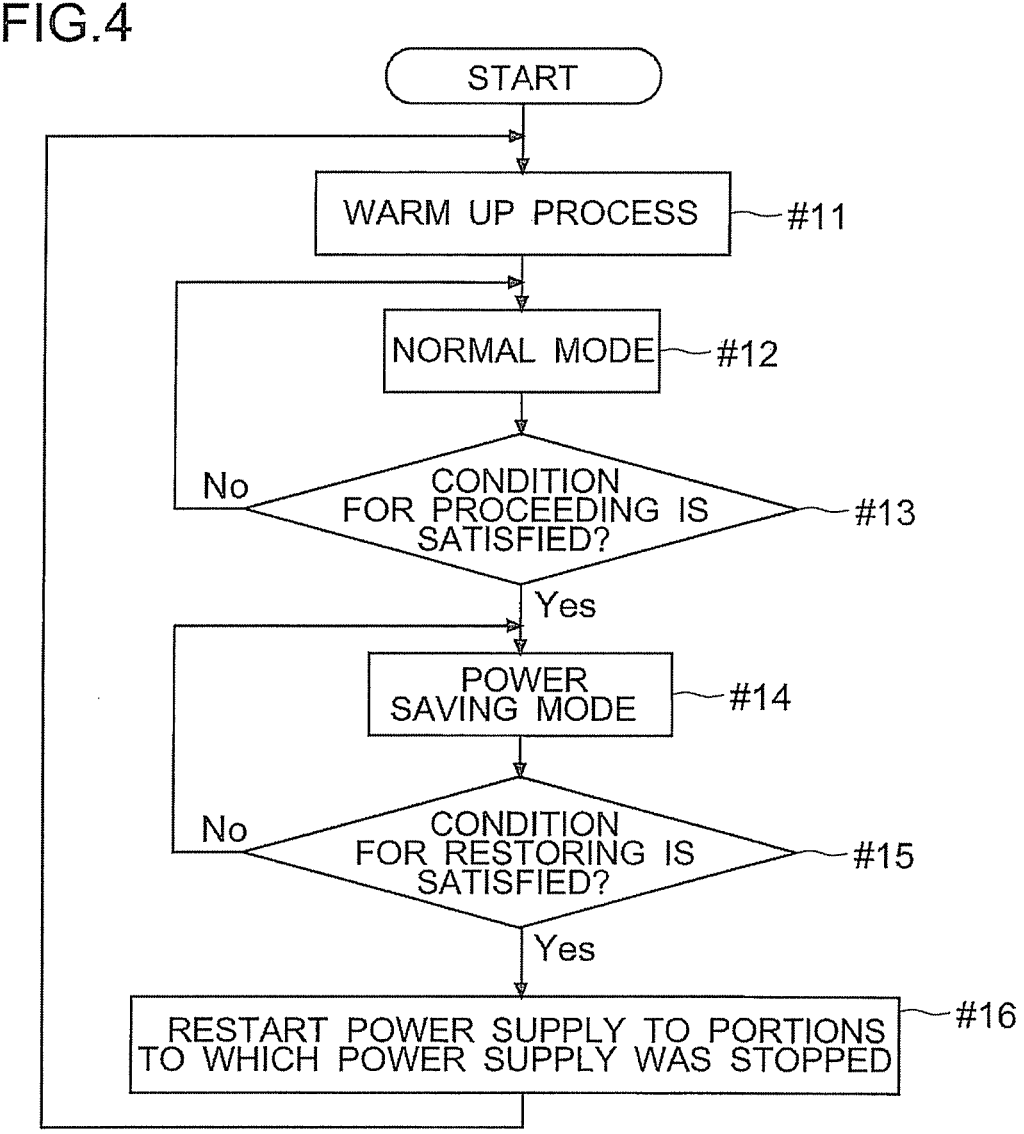
FIG. 4 is a flowchart for explaining an example of a transition between a normal mode and a power saving mode of the multifunction peripheral according to the embodiment.
Figure 5:
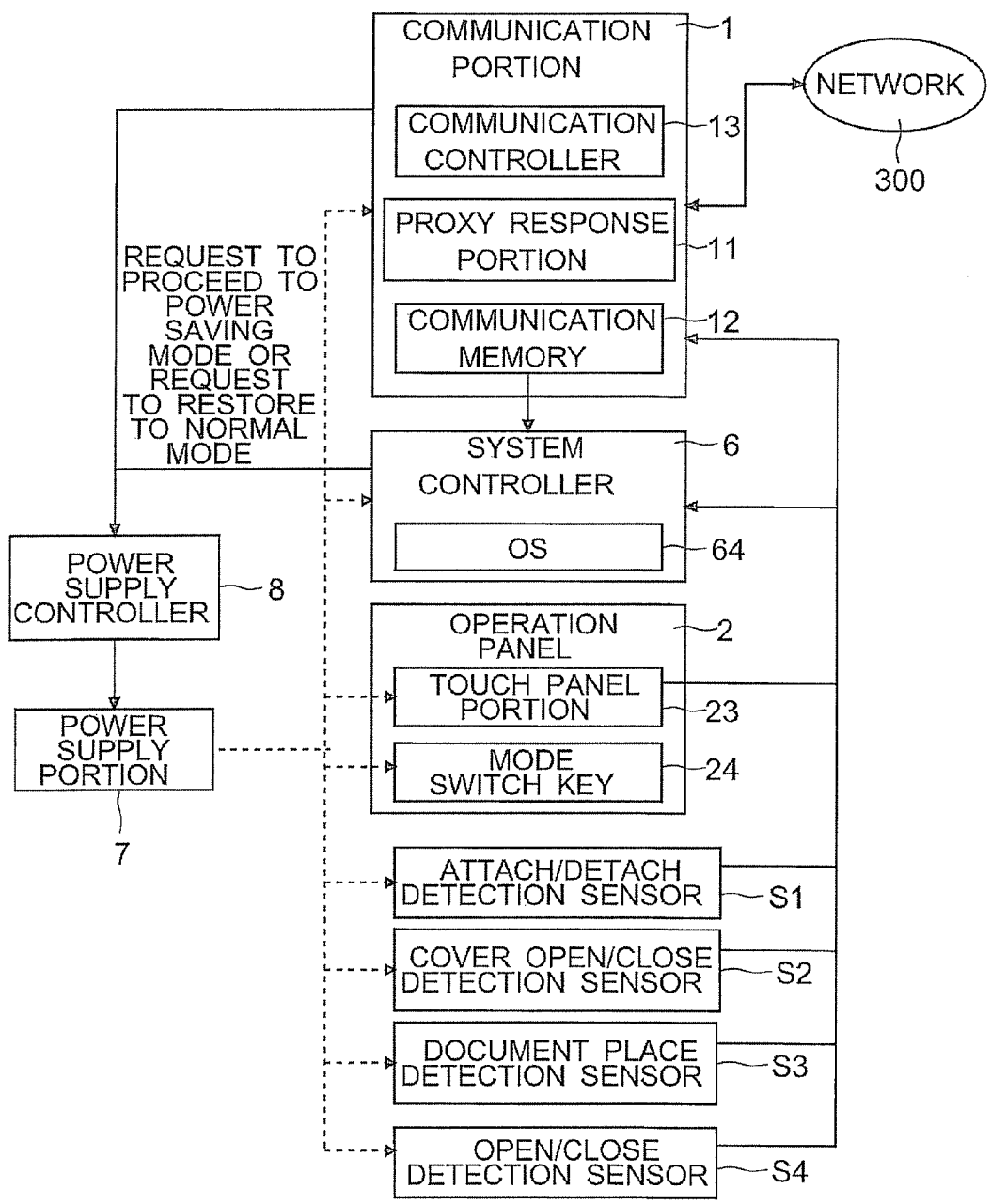
FIG. 5 is a diagram illustrating an example of an operation detection portion for detecting occurrence of a cause of restoring to the normal mode according to the embodiment.

Next, with reference to FIG. 4 and FIG. 5, transition between the normal mode and the power saving mode is described. FIG. 4 is a flowchart for explaining the transition between the normal mode and the power saving mode. FIG. 5 is a diagram illustrating an example of the operation detection portion for detecting occurrence of a cause of restoring to the normal mode.

First, the flow of FIG. 4 starts when the main switch 101 is turned on in the state where the multifunction peripheral 100 is connected to the commercial power source via an outlet so that the main power of the multifunction peripheral 100 is turned on.

When the main switch 101 is turned on, the system controller 6 and the storage portion 63 are activated so that the document feeder 3a, the image reader 3b, the operation panel 2, the printing portion 10, the communication portion 1, and the like start warm up processes (Step #11). Then, the multifunction peripheral 100 becomes the normal mode (Step #12). Then, the system controller 6 and the communication portion 1 check whether or not a condition for proceeding to the power saving mode is satisfied (Step #13). In other words, when the condition for proceeding to the predetermined power saving mode is satisfied in the normal mode, the normal mode is changed to the power saving mode.

The condition for proceeding to the predetermined power saving mode can be determined in advance as an arbitrary condition. In the multifunction peripheral 100 of this embodiment, a mode switch key 24 such as a power save key for instructing to switch between the normal mode and the power saving mode is disposed in the operation panel 2, and to press the mode switch key 24 is the condition for proceeding to the power saving mode. In addition, elapse of a predetermined time for proceeding to the power saving mode (for example, a few minutes) while the operation detection portion detects no operation and input to the multifunction peripheral 100 after a job is completed in the normal mode (in the standby state with no operation) is also the condition for proceeding to the power saving mode. For instance, the CPU 61 disposed in the system controller 6 or the communication portion 1 measures the time for proceeding to the power saving mode.

Here, as illustrated in FIG. 5, a plurality of operation detection portions for detecting the operation and input to the multifunction peripheral 100 are disposed in the multifunction peripheral 100. The multifunction peripheral 100 includes the communication portion 1, the touch panel portion 23, an attach/detach detection sensor S1, a cover open/close detection sensor S2, a document place detection sensor S3, an open/close detection sensor S4, and the like as the operation detection portions. Note that the power supply controller 8 supplies power to the operation detection portion even during the power saving mode.

The communication portion 1 receives input of print data from the computer 200. When receiving the print data, the communication portion 1 transmits the print data to the system controller 6 and the storage portion 63. The touch panel portion 23 detects a user's operation to the operation panel 2, and notifies the system controller 6 or the communication portion 1 when the operation is performed.

The attach/detach detection sensor S1 detects attachment or detachment of a sheet feed cassette 40 of the paper sheet feeder 4a, and an output thereof changes between when the sheet feed cassette 40 is attached and when the same is detached. For instance, the attach/detach detection sensor S1 is an interlock switch contacting with the attached sheet feed cassette 40 (see FIG. 1). The cover open/close detection sensor S2 detects open or close of a cover (for example, a right side cover 102) of the multifunction peripheral 100 disposed for dealing with jamming or maintenance, and an output thereof changes between when the cover is opened and when the cover is closed. For instance, the cover open/close detection sensor S2 is an optical sensor or an interlock switch contacting with the cover (see FIG. 1).

The document place detection sensor S3 is a sensor for detecting presence or absence of a document on a document tray 33 of the document feeder 3a on which a document is set. An output of the document place detection sensor S3 changes between when a document is set and when a document is not set. For instance, the document place detection sensor S3 is an optical sensor (see FIG. 1). In addition, the open/close detection sensor S4 is a sensor for detecting whether or not the document feeder 3a is lifted for copying or the like. An output of the open/close detection sensor S4 changes between when the document feeder 3a is lifted and when the same is put down. For instance, the open/close detection sensor S4 is an optical sensor (see FIG. 1).

The outputs of these operation detection portions are supplied to the system controller 6 or the communication portion 1. In this way, the system controller 6 and the communication portion 1 recognize presence or absence of an operation to the multifunction peripheral 100, and recognize whether or not the time for proceeding to the power saving mode has elapsed while detecting no operation and input to the multifunction peripheral 100. Further, when recognizing that the condition for proceeding to the power saving mode is satisfied, the system controller 6 or the communication portion 1 issues an instruction to the power supply controller 8 to proceeds to the power saving mode (power saving mode proceeding instruction). When receiving this instruction, the power supply controller 8 controls the switch portion 81 to stop power supply to predetermined supply stop portions.

When the condition for proceeding to the power saving mode is not satisfied (No in Step #13), the flow returns to Step #12. On the other hand, when the condition for proceeding to the power saving mode is satisfied (Yes in Step #13), the system controller 6 or the communication portion 1 issues an instruction to the power supply controller 8 so that the multifunction peripheral 100 becomes the power saving mode (Step #14).

Further, the communication portion 1 checks whether or not a predetermined condition for restoring to the normal mode is satisfied (Step #15). In other words, the communication portion 1 checks whether or not to cancel the power saving mode.

Here, power is supplies to limited portions in the power saving mode. Therefore, various functions of the multifunction peripheral 100 (copy, transmission, and print) cannot be used. Therefore, in the multifunction peripheral 100 of this embodiment, when the restoration condition is satisfied, the multifunction peripheral 100 is restored from the power saving mode to the normal mode so that various functions of the multifunction peripheral 100 can be used.

In the multifunction peripheral 100 of this embodiment, when there is an operation or input to the multifunction peripheral 100, the system controller 6 determines that the restoration condition is satisfied. The communication portion 1 recognizes based on outputs of the operation detection portions that there is an operation or input to the multifunction peripheral 100 (that the touch panel portion 23, the attach/detach detection sensor S1, the cover open/close detection sensor S2, the document place detection sensor S3, the open/close detection sensor S4, or the like has detected an operation, and that the communication portion 1 has detected an input of the print data).

When the communication portion 1 recognizes that the restoration condition is satisfied (Yes in Step #15), the communication portion 1 instructs the power supply controller 8 to restore to the normal mode. When receiving this instruction, the power supply controller 8 restarts power supply to the portions to which power supply was stopped in the power saving mode (Step #16). Then, the flow returns to Step #11. On the other hand, when it can be recognized that the restoration condition is satisfied (No in Step #15), the flow returns to Step #14.

(Temporary Restoration of System Controller 6 During Power Saving Mode)

Figure 6:
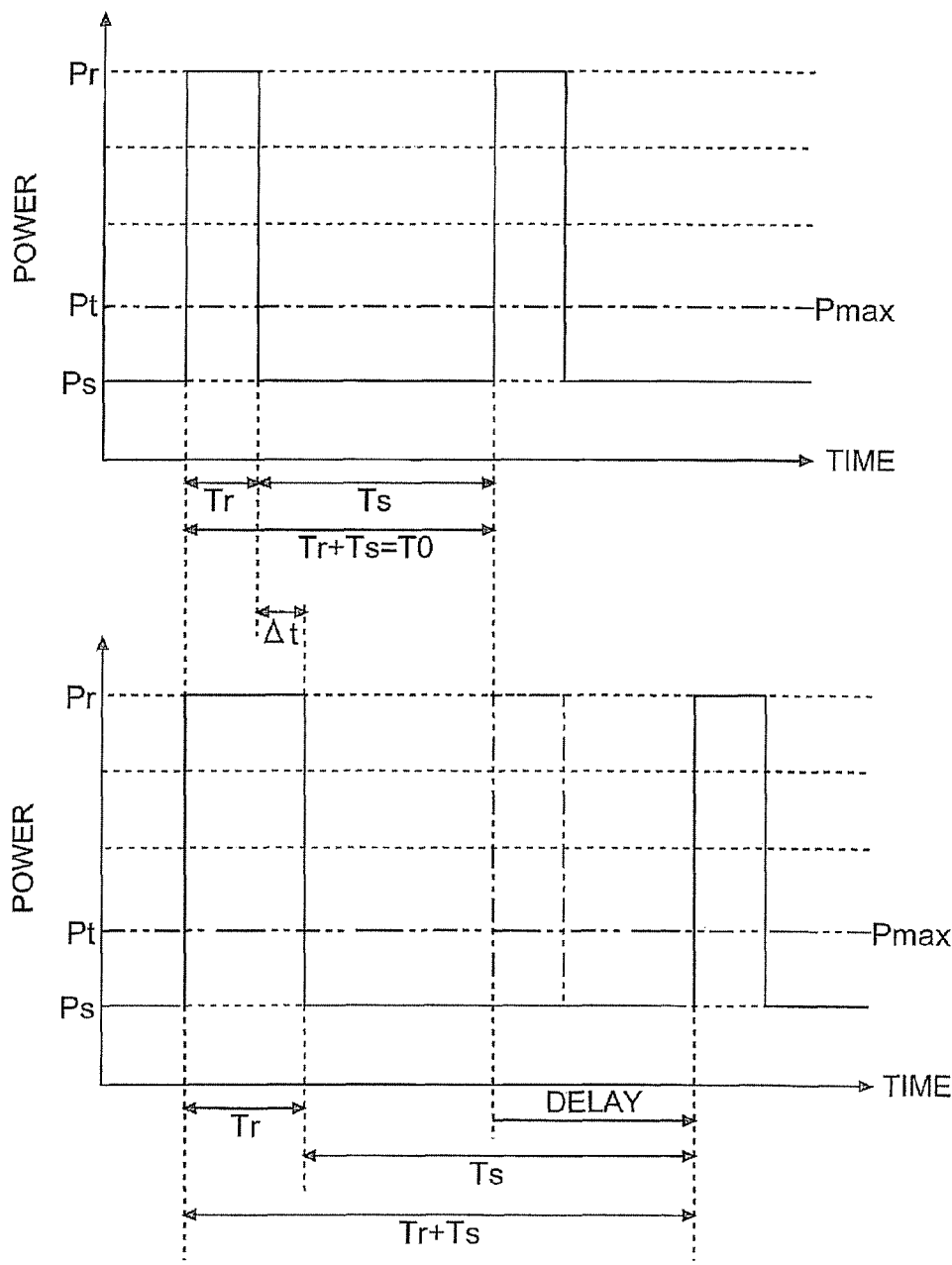
FIG. 6 is a timing chart for explaining temporary restoration of a system controller during the power saving mode.

Next, with reference to FIG. 6, temporary restoration of the system controller 6 during the power saving mode is described. FIG. 6 is a timing chart for explaining temporary restoration of the system controller 6 in the power saving mode.

In order to conform various standards about power saving and to reduce power consumption of the image forming apparatus, it is necessary to suppress power consumption during the power saving mode to be lower than a predetermined value. In particular, because the system controller 6 is temporarily restored in the power saving mode in the multifunction peripheral 100 of this embodiment, it is necessary to prevent the power consumption during the power saving mode from being increased.

Because the system controller 6 is temporarily restored every time when a process to be performed by the system controller 6 occurs during the power saving mode, response performance to the request is increased (response speed is increased). However, when the system controller 6 is temporarily restored too often during the power saving mode, power consumption of the system controller 6 during the power saving mode is increased. A target or a specification of the power consumption of the system controller 6 during the power saving mode is determined in advance in a designing stage or the like. When the system controller 6 is temporarily restored too often during the power saving mode, the target or the specification cannot be satisfied.

Therefore, in the multifunction peripheral 100 of this embodiment, the communication portion 1 does not restore the system controller 6 promptly when a process to be performed by the system controller 6 occurs during the power saving mode. Further, a time point to start power supply to the system controller 6 during the power saving mode is delayed within a range satisfying the target or the specification so that a time point to execute the process is delayed. Further, when the system controller 6 is supplied with power to restore during the power saving mode, the system controller 6 performs stored processes as a batch process. In this way, frequency of temporarily restoring the system controller 6 during the power saving mode is decreased.

Specific description is added with reference to FIG. 6. In FIG. 6, a vertical axis indicates power consumption, and a horizontal axis indicates time.

First, in the multifunction peripheral 100 of this embodiment, during the power saving mode, a supplying power Pr that is a power consumption in a supply time Tr in which power is supplied to the system controller 6 is determined in advance. The supplying power Pr can be determined based on an average value or a maximum value of power consumption of the multifunction peripheral 100 during the supply time Tr.

In addition, in the multifunction peripheral 100 of this embodiment, during the power saving mode, a stop power Ps that is a power consumption in stop time Ts in which power is not supplied to the system controller 6 is determined in advance. The stop power Ps can be determined based on an average value or a maximum value of power consumption of the multifunction peripheral 100 during the stop time Ts.

Further, in the multifunction peripheral 100 of this embodiment, a permissible maximum power Pmax is also determined in advance as a maximum value of an average power consumption Pt of the multifunction peripheral 100 during the power saving mode. In order to satisfy a standard, a target, or a specification, the permissible maximum power Pmax is determined as a maximum value in a permissible range of the average power consumption Pt of the multifunction peripheral 100.

Here, a time ratio Dt (duty ratio) of the supply time Tr to the sum of the supply time Tr and the stop time Ts in a period from stop of power supply after performing power supply to the system controller 6 until next start of power supply in the power saving mode can be determined by the following equation (1).

$$Dt = Tr/(Tr+Ts) \qquad (1)$$

Further, the average power consumption Pt in the supply time Tr and the stop time Ts of one period (unit time) of the system controller 6 in the power saving mode is determined based on the time ratio Dt by the following equation (2).

$$Pt = PrDt + Ps(1-Dt) \quad (2)$$

In addition, concerning the time ratio Dt (duty ratio) of the supply time Tr to the sum of the supply time Tr and the stop time Ts in a period of ON/OFF of the power (the period from stop of power supply after performing power supply to the system controller 6 until next start of power supply) during the power saving mode, a permissible time ratio Dmax is determined. The permissible time ratio Dmax is determined so that the average power consumption Pt of the multifunction peripheral 100 in the power saving mode during one period does not exceed the permissible maximum power Pmax.

Further, the communication portion 1 issues an instruction to the power supply controller 8. The power supply controller 8 adjusts a length of the stop time Ts and temporarily restore the system controller 6 (performs supply and stop of power to the system controller 6) so that the average power consumption Pt of the multifunction peripheral 100 does not exceed the permissible maximum power Pmax (becomes lower than the same). In this way, supply and stop of power to the system controller 6 are repeated so that the average power consumption Pt of the image forming apparatus during the power saving mode becomes smaller than the permissible maximum power Pmax. Therefore, it is possible to simply and securely reduce power consumption of the image forming apparatus during the power saving mode by adjusting the duty ratio concerning the time in which power is supplied to the system controller 6 and the time in which power is not supplied to the system controller 6. This point is described with reference to FIG. 6.

First, in the multifunction peripheral 100 of the embodiment, it is possible to determine a reference period T0 of supply and stop of power to the system controller 6. The reference period T0 may be approximately a few seconds (or longer). The upper part of FIG. 6 illustrates an example of performing supply and stop of power to the system controller 6 at the reference period T0.

When performing supply and stop of power at the reference period T0, a time obtained by multiplying the reference period T0 by the permissible time ratio Dmax is the supply time Tr when performing the supply and stop of power to the system controller 6 at the reference period T0. On the other hand, a time obtained by multiplying the reference period T0 by (1−permissible time ratio Dmax) is the stop time Ts when performing the supply and stop of power to the system controller 6 at the reference period T0.

Here, the communication portion 1 is provided with the communication memory 12 (see FIG. 5). The communication memory 12 is a RAM. During the stop time Ts, the communication memory 12 stores a request to communicate from the network 300 to be performed by the system controller 6 when the system controller 6 is temporary restored next time. Further, the communication memory 12 (communication portion 1) transmits the stored request to the system controller 6 when the system controller 6 is temporary restored. Further, the communication portion 1 receives a result of the process performed by the system controller 6 based on the request to communicate, so as to transmit to the network 300 as a response to the request.

Here, the communication portion 1 of this embodiment includes the proxy response portion 11 that performs a part of process for response related to the network 300 on behalf of the system controller 6 for performing communication, so as to reduce a process to be performed by the system controller 6 when being temporarily restored. The proxy response portion 11 is a circuit performing a process to respond to a part of requests from the network 300 on behalf of the system controller 6. The proxy response portion 11 performs, for example, a process to respond an echo request by ping from the network 300 or a process of request and response in an SNMP protocol. Therefore, the communication memory 12 of the communication portion 1 stores requests to communicate from the network 300 to which the proxy response portion 11 does not perform proxy response during the stop time Ts. By this proxy response portion 11, it is possible to reduce the process to be performed by the system controller 6 when being temporarily restored during the power saving mode. Therefore, it is possible to reduce time for which power must be supplied to the system controller 6 for temporary restoration during the power saving mode, and it is possible to reduce power consumption in the system controller 6 during the power saving mode.

Here, when there are many requests stored in the communication memory 12 during the stop time Ts, or when a request that takes a long time to process is stored in the communication memory 12, there is a case where all the requests stored in the communication memory 12 cannot be processed before the end of the supply time Tr (obtained by multiplying the reference period T0 by the permissible time ratio Dmax) in the reference period T0. In this case, the communication portion 1 or the system controller 6 does not give the power supply controller 8 the request to stop based on arrival of the start of the stop time Ts in the reference period T0. Further, the communication portion 1 or the system controller 6 controls the power supply controller 8 to continue the power supply until the process to be performed is completed (elongates the supply time Tr until the process is completed). Further, when the process performed by the system controller 6 is completed, the communication portion 1 or the system controller 6 issues the request to stop to the power supply controller 8 so as to control the power supply controller 8 to stop power supply to the system controller 6.

The lower part of FIG. 6 illustrates a case where the supply time Tr in the reference period T0 is elongated (a difference Δt with the reference period T0 is illustrated in FIG. 6). In this case, the communication portion 1 determines the stop time Ts corresponding to the elongated supply time Tr based on the supplying power Pr, the stop power Ps, the permissible maximum power Pmax, and the permissible time ratio Dmax.

Specifically, Dt in the equation (1) Dt=Tr/(Tr+Ts) is replaced with the permissible time ratio Dmax, and the equation is organized. Then, the following equation (3) is obtained.

$$Ts = \{Tr(1-D\max)\}/D\max \quad (3)$$

On the basis of this equation (3), corresponding to the elongated supply time Tr, there is determined the stop time Ts in which the average power consumption Pt of the multifunction peripheral 100 is lower than the permissible maximum power Pmax (necessary time, or the stop time Ts applied when being elongated).

As illustrated in the lower part of FIG. 6, when the communication portion 1 elongates the supply time Tr, in synchronization with this, the stop time Ts is elongated to secure the permissible time ratio Dmax or smaller, and then power supply to the system controller 6 is started. In other words, the communication portion 1 does not request the power supply controller 8 to start the power supply to the system controller 6 until elapse of the stop time Ts in which the time ratio Dt of the supply time Tr to the sum of the supply time Tr and the stop time Ts in the period becomes the permissible time ratio Dmax or smaller (does not permit the power supply controller 8 to start power supply to the system controller 6 until the necessary time elapses from stop of the power supply to the system controller 6). In this way, by adjusting the length of the stop time Ts, it is possible to securely reduce the average power consumption Pt of the system controller 6 during the power saving mode so that the permissible maximum power Pmax as a set target or specification is not exceeded.

In other words, the communication portion 1 causes the power supply controller 8 to start power supply to the system controller 6 when the necessary time ends (elapses) from the stop of power supply to the system controller 6. When the power supply controller 8 receives the request to start power supply from the communication portion 1 in the power saving mode, the power supply controller 8 starts the power supply to the system controller 6. In this way, by the request from the communication portion 1, it is possible to control the power supply controller 8 to perform supply and stop of power to the system controller 6. In this case, a period of the supply and stop of power is longer than the reference period T0. Further, in the lower part of FIG. 6, the supply time Tr in the case of the reference period T0 is illustrated by a double-dot dashed line.

Further, the example of setting the reference period T0 is described above, but it is possible to adopt a structure in which for temporary restoration in the power saving mode, after starting power supply to the system controller 6, when all the process to be performed by the system controller 6 are completed, the system controller 6 or the communication portion 1 issued the request to stop to the power supply controller 8, and the communication portion 1 always determine the stop time Ts in which the time ratio Dt of the supply time Tr to the sum of the supply time Tr and the stop time Ts in the period becomes the permissible time ratio Dmax or smaller in accordance with a length of the supply time Tr. Further, when the determined stop time Ts elapses from the stop of power supply to the system controller 6, the communication portion 1 issues the request to start to the power supply controller 8 so that the power supply controller 8 starts power supply to the system controller 6. In this case, depending on a situation, the stop time Ts becomes longer or shorter than that in the case of the reference period T0 in accordance with the supply time Tr.

(Flow of Temporary Restoration During the Power Saving Mode)

Figure 7:
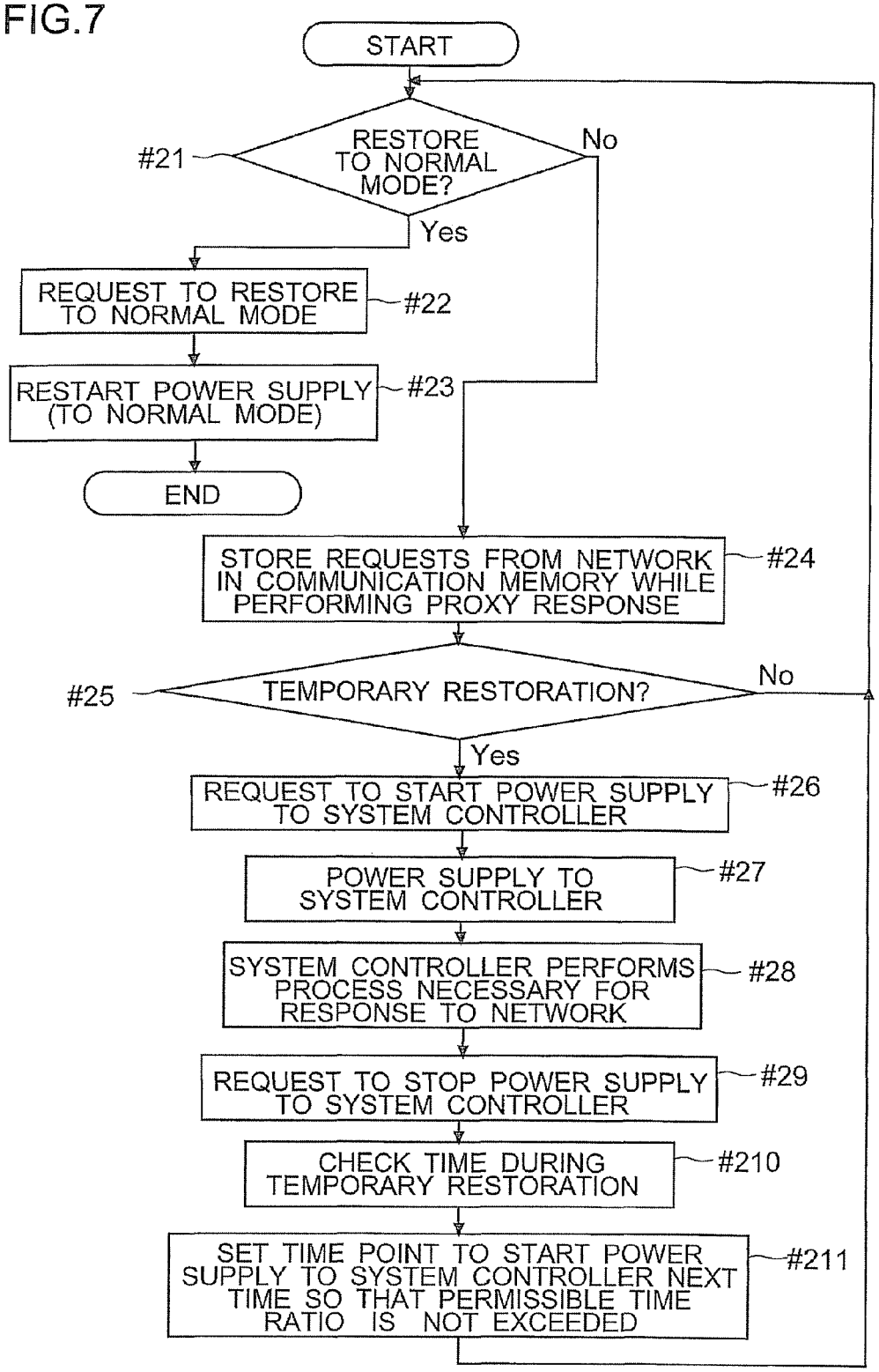
FIG. 7 is a flowchart showing a process flow concerning the temporary restoration of the system controller during the power saving mode.

Next, with reference to FIG. 7, there is described a process flow concerning temporary restoration of the system controller 6 during the power saving mode of the multifunction peripheral 100 according to this embodiment. FIG. 7 is a flowchart illustrating a process flow concerning the temporary restoration of the system controller 6 during the power saving mode.

The flow of FIG. 7 starts when the power saving mode starts. At this time point, the power supply controller 8 does not supply power to the system controller 6.

First, the communication portion 1 checks whether or not to restore to the normal mode (whether or not the condition for restoring to the normal mode is satisfied) based on outputs from the operation detection portions (Step #21).

When restoring to the normal mode (Yes in Step #21), the communication portion 1 transmits a request to restore to the normal mode to the power supply controller 8 (Step #22). When receiving the request to restore, the power supply controller 8 restarts power supply to the portions to which power supply was stopped in the power saving mode so that the multifunction peripheral 100 is restored to the normal mode (Step #23). As a result, this flow concerning the power saving mode is finished (END).

On the other hand, when the normal mode is not restored (No in Step #21), the communication portion 1 stores requests from the network 300 in the communication memory 12 during the period in which power is not supplied to the system controller 6 (during the stop time Ts) (Step #24). Here, a request that can be processed by the proxy response portion 11 is responded by the proxy response portion 11. In this way, the communication portion 1 includes the communication memory 12 (see FIG. 5). During the stop time Ts, the communication memory 12 stores requests to communicate from the network 300 to be processed by the system controller 6 when the system controller 6 is temporarily restored next time. Further, the communication memory 12 (communication portion 1) transmits the stored requests to the system controller 6 when the system controller 6 is temporary restored. Then, the communication portion 1 receives a result of a process performed by the system controller 6 based on the request to communicate and transmits a result of the process to the network 300 as a response to the request.

Further, in the temporary restoration during the power saving mode, the system controller 6 performs the process concerning the stored request to communicate before the time-out time determined in the communication protocol elapses, and the communication portion 1 transmits a result of the process to the network. In this way, although the requests to process are stored in the communication memory 12, a problem such as time-out does not occur.

Further, the communication portion 1 starts power supply to the system controller 6 during the power saving mode and checks whether or not a time point to temporarily restore has come (Step #25). For this purpose, the communication portion 1 includes a time measuring circuit for measuring time. When the time point to temporarily restore has not come (No in Step #25), the flow returns to Step #21 (or Step #24).

On the other hand, when the time point to temporarily restore has come (Yes in Step #25), the communication portion 1 transmits the request to start power supply to the system controller 6 to the power supply controller 8 so as to temporarily restore the system controller 6 (Step #26).

When receiving this request, the power supply controller 8 performs power supply to the system controller 6 (Step #27). In this way, the communication portion 1 starts the system controller 6 so that the system controller 6 performs the process necessary for responding to the requests from the network 300 stored during the stop time Ts (Step #28).

Further, when the system controller 6 finishes necessary process, the communication portion 1 (or the system controller 6) transmits the request to stop the power supply to the system controller 6 to the power supply controller 8 (Step #29).

Further, the communication portion 1 checks the time during which the system controller 6 is temporarily restored in the power saving mode (from the request to start to the request to stop) (Step #210). Then, the communication portion 1 set a time point to start power supply to the system controller 6 (time point to transmit the request to start to the power supply controller 8) next time during the power saving mode, so that the ratio of the supply time Tr to the sum of the supply time Tr and the stop time Ts does not exceeds the predetermined permissible time ratio Dmax (Step #211). Then, the flow returns to Step #21. In this way, the system controller 6 performs the process concerning communication during the power saving mode, and the power supply controller 8 adjusts the length of the stop time Ts during the power saving mode so that the average power consumption Pt of the image forming apparatus in the power saving mode does not exceed the predetermined permissible maximum power Pmax, so as to temporarily restore the system controller 6 during the power saving mode. In this way, temporary power supply to the system controller 6 is performed during the power saving mode at a frequency such that the permissible maximum power Pmax as the set target or specification is not exceeded. Therefore, the power consumption of the image forming apparatus (multifunction peripheral 100) during the power saving mode can be securely reduced. Further, the system controller 6 started by the temporary power supply performs the process to be processed during the temporary restoration (such as the process requested during the stop time Ts and delayed to perform) as a batch process. Therefore, the response of the image forming apparatus to the request is not so delayed. Therefore, it is possible that the image forming apparatus can have high response performance.

For instance, when the supply time Tr is shorter than the time obtained by multiplying the reference period T0 by the permissible time ratio Dmax, the communication portion 1 sets the time point to start power supply in the predetermined reference period T0 as the time point to start power supply to the system controller 6 next time. On the other hand, when the supply time Tr is longer than the time obtained by multiplying the reference period T0 by the permissible time ratio Dmax, the communication portion 1 increases the stop time Ts to be longer than that in the reference period T0 in order to comply the permissible time ratio Dmax, so as to set the time point to start power supply to the system controller 6 next time. In this way, when the temporary restoration of the system controller 6 is repeated during the power saving mode, the average power consumption Pt of the multifunction peripheral 100 does not exceed a predetermined maximum permissible power.

Although the embodiment of the present disclosure is described above, the scope of the present disclosure is not limited to this embodiment, and it is possible to add various modifications within the scope without deviating from the spirit of the disclosure.

What is claimed is:

1. An image forming apparatus having a normal mode and a power saving mode for reducing power consumption to be smaller than that in the normal mode, in which the normal mode is changed to the power saving mode when a predetermined condition for proceeding to the power saving mode is satisfied in the normal mode, and the normal mode is restored when a predetermined restoration condition is satisfied in the power saving mode, the apparatus comprising:
    a printing portion constituting a system so as to perform printing;
    a communication portion connected to a network so as to perform a communication process;
    a system controller configured to perform control concerning operation of the image forming apparatus, and a process concerning communication for performing network communication by the communication portion, and to perform the process concerning communication even during the power saving mode; and
    a power supply controller configured to supply power to the printing portion, the system controller, and the communication portion in the normal mode, while in the power saving mode, to continue power supply to the communication portion, to stop power supply to the printing portion, and to repeat a supply time during which power is supplied to the system controller and a stop time during which power supply to the system controller is stopped, and configured to adjust a length of the stop time during the power saving mode so that average power consumption of the image forming apparatus in the power saving mode does not exceed a predetermined permissible maximum power, so as to temporarily restore the system controller during the power saving mode.

2. The image forming apparatus according to claim 1, wherein
    the power supply controller performs supply and stop of power to the system controller so that a time ratio of the supply time to a sum of the supply time and the stop time is a predetermined permissible time ratio or smaller during the power saving mode, and
    the permissible time ratio is determined so that an average power consumption of the image forming apparatus in the power saving mode does not exceed the permissible maximum power.

3. The image forming apparatus according to claim 2, wherein
    the power supply controller performs supply and stop of power to the system controller based on the permissible time ratio in a predetermined reference period in the power saving mode,
    when a process to be performed during the power saving mode is not completed in the supply time obtained by multiplying the reference period by the permissible time ratio, the power supply controller elongates the supply time until the process is completed,
    when the process is completed, the power supply controller stops power supply to the system controller, and
    the power supply controller elongates the stop time so that the permissible time ratio is not exceeded due to the elongated supply time, so as to start power supply to the system controller next time.

4. The image forming apparatus according to claim 1, wherein the communication portion includes a proxy response portion configured to perform a part of a process to respond to the network on behalf of the system controller so as to perform communication.

5. The image forming apparatus according to claim 2, wherein
    the communication portion determines necessary time from stop of power supply to the system controller until the time ratio becomes the permissible time ratio or smaller based on a predetermined supplying power as power consumption of the image forming apparatus in the supply time, a predetermined stop power as power consumption in the stop time, and the permissible maximum power in the power saving mode, and issues a request to start power supply to the system controller to the power supply controller when the necessary time ends, and
    the power supply controller starts power supply to the system controller when receiving the request to start power supply from the communication portion in the power saving mode.

6. The image forming apparatus according to claim 1, wherein
    the communication portion includes a communication memory,
    during the stop time, the communication memory stores a request to communicate from a network to be performed by the system controller when the system controller is temporarily restored,
    when the system controller is temporarily restored, the communication memory transmits the stored request to the system controller, and
    the communication portion receives a result of a process performed by the system controller based on the request to communicate and transmits the result of the process to the network as a response to the request.

7. The image forming apparatus according to claim 6, wherein during the temporary restoration in the power saving mode, the system controller performs the process concerning the stored request to communicate before time-out time determined in a communication protocol elapses, and the communication portion transmits a result of the process to the network.

8. A control method for an image forming apparatus, the method comprising the steps of:

changing a normal mode to a power saving mode for reducing power consumption to be smaller than that in the normal mode when a predetermined condition for proceeding to the power saving mode is satisfied in the normal mode;

restoring from the power saving mode to the normal mode when a predetermined restoration condition is satisfied;

supplying power in the normal mode to a printing portion constituting a system so as to perform printing, a communication portion connected to a network so as to perform a communication process, and a system controller configured to perform control concerning operation of the image forming apparatus and a process concerning communication for performing network communication by the communication portion;

performing the process concerning communication even during the power saving mode;

in the power saving mode, continuing to supply power to the communication portion, stopping power supply to the printing portion, and repeating a supply time during which power is supplied to the system controller and a stop time during which power supply to the system controller is stopped; and in the power saving mode, adjusting a length of the stop time so that average power consumption of the image forming apparatus in the power saving mode does not exceed a predetermined permissible maximum power, so as to temporarily restore the system controller during the power saving mode.

9. The control method for an image forming apparatus according to claim 8, further comprising the step of performing supply and stop of power to the system controller so that a time ratio of the supply time to a sum of the supply time and the stop time is a predetermined permissible time ratio or smaller during the power saving mode, wherein the permissible time ratio is determined so that an average power consumption of the image forming apparatus in the power saving mode does not exceed the permissible maximum power.

10. The control method for an image forming apparatus according to claim 9, further comprising the step of:

performing supply and stop of power to the system controller based on the permissible time ratio in a predetermined reference period in the power saving mode;

when a process to be performed during the power saving mode is not completed in the supply time obtained by multiplying the reference period by the permissible time ratio, elongating the supply time until the process is completed; and when the process is completed, stopping power supply to the system controller, and elongating the stop time so that the permissible time ratio is not exceeded due to the elongated supply time, so as to start power supply to the system controller next time.

11. The control method for an image forming apparatus according to claim 8, further comprising the step of providing the communication portion with a proxy response portion configured to perform a part of a process to response to the network on behalf of the system controller so as to perform communication.

12. The control method for an image forming apparatus according to claim 9, further comprising the steps of:

determining necessary time from stop of power supply to the system controller until the time ratio becomes the permissible time ratio or smaller based on a predetermined supplying power as power consumption of the image forming apparatus in the supply time, a predetermined stop power as power consumption in the stop time, and the permissible maximum power in the power saving mode;

issuing a request to start power supply to the system controller when the necessary time ends; and starting power supply to the system controller after the request to start power supply from the communication portion in the power saving mode.

13. The control method for an image forming apparatus according to claim 8, further comprising the steps of:

providing the communication portion with a communication memory;

storing in the communication memory a request to communicate from a network to be performed by the system controller when the system controller is temporarily restored;

transmitting the stored request from the communication memory to the system controller when the system controller is temporarily restored; and receiving a result of a process performed by the system controller based on the request to communicate, and transmitting the result of the process to the network as a response to the request.

14. The control method for an image forming apparatus according to claim 13, further comprising the steps of:

causing the system controller to perform the process concerning the stored request to communicate before time-out time determined in a communication protocol elapses, during the temporary restoration in the power saving mode; and transmitting a result of the process to the network.

* * * * *